(12) United States Patent
Valencia Arcila et al.

(10) Patent No.: US 10,648,393 B2
(45) Date of Patent: May 12, 2020

(54) OUTER BEADED BODY FOR MOUNTING AND JOINT INTERFACES

(71) Applicant: Cummins Emission Solutions Inc., Columbus, IN (US)

(72) Inventors: Juan Manuel Valencia Arcila, Columbus, IN (US); Shane O'Connor, Cottage Grove, WI (US); Michael T. Lynch, Mineral Point, WI (US); Shalini Chauhan, Dehradun (IN)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 15/738,029

(22) PCT Filed: Jun. 27, 2016

(86) PCT No.: PCT/US2016/039549
§ 371 (c)(1),
(2) Date: Dec. 19, 2017

(87) PCT Pub. No.: WO2017/003921
PCT Pub. Date: Jan. 5, 2017

(65) Prior Publication Data
US 2018/0306090 A1   Oct. 25, 2018

Related U.S. Application Data

(60) Provisional application No. 62/186,662, filed on Jun. 30, 2015.

(51) Int. Cl.
*F01N 13/00*    (2010.01)
*F01N 13/18*    (2010.01)
(Continued)

(52) U.S. Cl.
CPC ......... *F01N 13/0097* (2014.06); *F01N 3/021* (2013.01); *F01N 3/208* (2013.01);
(Continued)

(58) Field of Classification Search
CPC ...... F01N 13/0097; F01N 13/18; F01N 3/021; F01N 3/2066; F01N 3/208; F01N 3/24; F01N 3/28; Y02T 10/24
(Continued)

(56) References Cited

U.S. PATENT DOCUMENTS

2006/0013746 A1* 1/2006 Bien ..................... F01N 3/2882
                                                                  422/179
2006/0144040 A1* 7/2006 Westerbeke, Jr. ........ F01N 3/04
                                                                   60/321
(Continued)

FOREIGN PATENT DOCUMENTS

CN     102112714 A    6/2011
DE   10 2010 060 071   5/2012

OTHER PUBLICATIONS

International Search Report and Written Opinion issued for PCT/US2016/039549, dated Sep. 19, 2016, 8 pages.
(Continued)

*Primary Examiner* — Patrick D Maines
*Assistant Examiner* — Dapinder Singh
(74) *Attorney, Agent, or Firm* — Foley & Lardner LLP

(57) ABSTRACT

Implementations described herein relate to features for a single module aftertreatment system. The single aftertreatment system includes a casing, a catalyst within the casing, and an outer body attached to a portion of the casing with a flat mounting zone on the outer body. The outer body includes a mounting bracket welded to the flat mounting zone. The flat mounting zone is separated from the casing so as to form an air gap between the flat mounting zone of the
(Continued)

Figure 1:
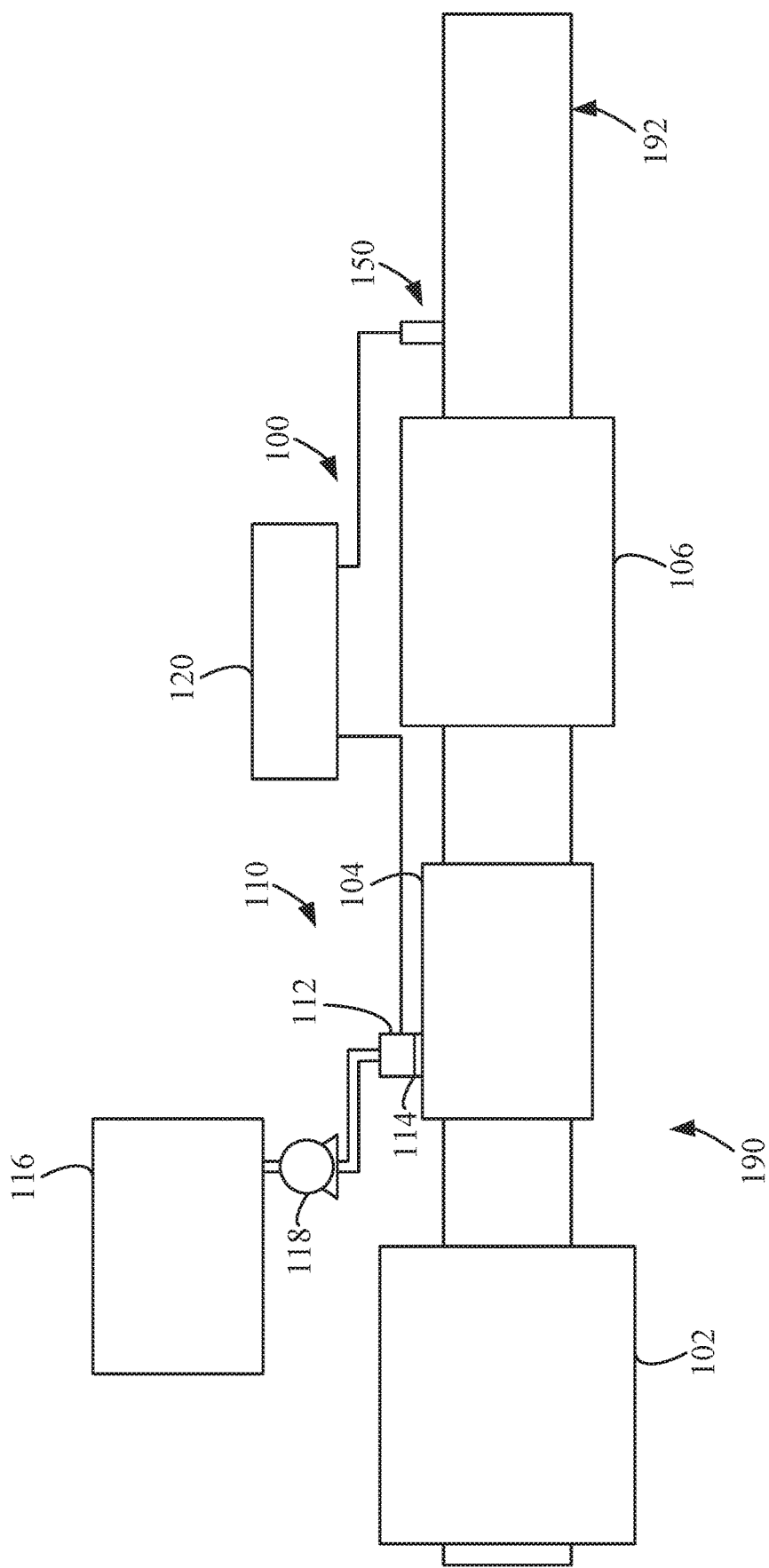

outer body and the casing. The outer body includes a beaded portion adjacent the flat mounting zone. The outer body includes an inner diameter portion, and the outer body is attached to a portion of the casing by a weld joint between the inner diameter portion and the portion of the casing.

14 Claims, 2 Drawing Sheets

(51) Int. Cl.
*F01N 3/20* (2006.01)
*F01N 3/28* (2006.01)
*F01N 3/021* (2006.01)
*F01N 3/24* (2006.01)

(52) U.S. Cl.
CPC .............. *F01N 3/2066* (2013.01); *F01N 3/24* (2013.01); *F01N 3/28* (2013.01); *F01N 13/18* (2013.01); *Y02T 10/24* (2013.01)

(58) Field of Classification Search
USPC .......................................... 60/274, 299–300
See application file for complete search history.

(56) References Cited

U.S. PATENT DOCUMENTS

| | | | |
|---|---|---|---|
| 2007/0056275 A1 | 3/2007 | Ichi et al. | |
| 2007/0062182 A1* | 3/2007 | Westerbeke, Jr. | ........ F01N 3/04 60/321 |
| 2007/0227131 A1* | 10/2007 | Hardesty | ............ B01D 53/9454 60/299 |
| 2010/0005789 A1 | 1/2010 | Moritsugu | |
| 2010/0083644 A1 | 4/2010 | Biedler et al. | |
| 2010/0240268 A1* | 9/2010 | Westerbeke, Jr. | ........ F01N 3/04 440/88 C |
| 2013/0142703 A1* | 6/2013 | Westerbeke, Jr. | ........ F01N 3/04 422/173 |

OTHER PUBLICATIONS

First Office Action issued for Chinese Patent Application No. 201680036604.9, dated Jun. 5, 2019, with English Language Translation, 9 pages.

* cited by examiner

OUTER BEADED BODY FOR MOUNTING AND JOINT INTERFACES

CROSS REFERENCE TO RELATED APPLICATIONS

The present application is a National Stage Application of PCT Application No. PCT/US2016/039549, filed Jun. 27 2016, which claims the benefit of priority to U.S. Provisional Patent Application No. 62/186,662, filed Jun. 30 2015. The contents of both applications are hereby incorporated by reference in their entireties.

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a SCR process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, or urea is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system up-stream of the catalyst chamber. The SCR system may include one or more sensors to monitor conditions within the exhaust system.

SUMMARY

Implementations described herein relate to features for a single module aftertreatment system.

One implementation relates to a single module aftertreatment system having a casing and a catalyst within the casing. The system includes an outer body attached to a portion of the casing and having a flat mounting zone on the outer body. In some implementations, the outer body includes a mounting bracket welded to the flat mounting zone. In some implementations, the flat mounting zone is separated from the casing so as to form an air gap between the flat mounting zone of the outer body and the casing. In further implementations, the outer body includes a beaded portion adjacent the flat mounting zone. In still further implementations, the outer body includes an inner diameter portion and the outer body is attached to a portion of the casing by a weld joint between the inner diameter portion and the portion of the casing.

Another implementation relates to a method of manufacturing a single module aftertreatment system. The method includes providing an inner body configured to contain a catalyst within the inner body and an outer body having an inner diameter portion and a flat mounting zone. The method also includes sliding the outer body over the inner body, and welding the inner diameter portion of the outer body to a portion of the inner body such that the flat mounting zone is separated from the inner body so as to form an air gap between the flat mounting zone of the outer body and the inner body.

A still further implementation relates to a single module aftertreatment system, comprising an inner body housing a catalyst, and an outer body. The outer body comprises a mounting zone, a first inner diameter portion at a first end of the mounting zone, and a second inner diameter portion at the second end of the mounting zone. The first inner diameter portion is attached to the inner body at a first location. The second inner diameter portion is attached to the inner body at a second location. The inner body, the mounting zone, the first inner diameter portion, and the second inner diameter portion define a gap between the outer body and the inner body that reduces heat transfer from the inner body to the mounting zone.

BRIEF DESCRIPTION

Figure 2:
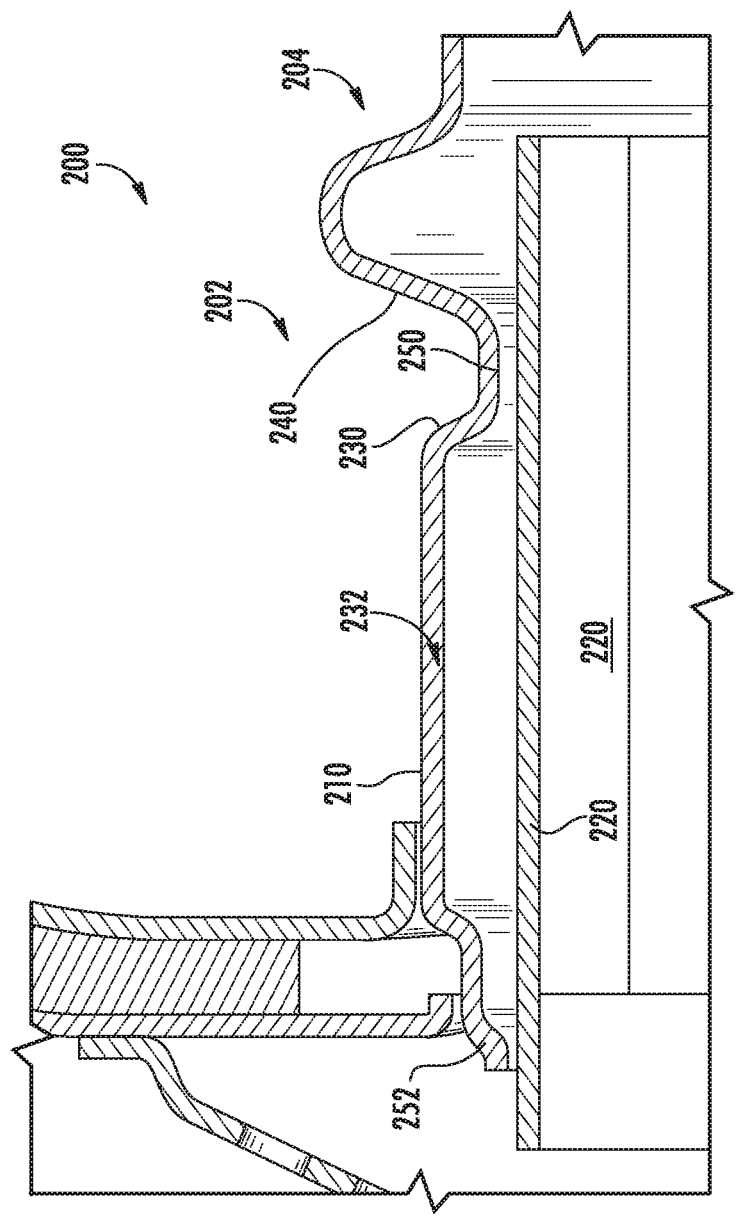

The details of one or more implementations are set forth in the accompanying drawings and the description below. Other features, aspects, and advantages of the disclosure will become apparent from the description, the drawings, and the claims, in which:

FIG. 1 is a block schematic diagram of an example selective catalytic reduction system having an example reductant delivery system for an exhaust system; and FIG. 2 is a partial cross-sectional view of an example outer beaded body for mounting and joint interfaces.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for a single module aftertreatment system. The various concepts introduced above and discussed in greater detail below may be implemented in any of numerous ways, as the described concepts are not limited to any particular manner of implementation. Examples of specific implementations and applications are provided primarily for illustrative purposes.

I. Overview

In some systems, a single module aftertreatment system may reduce the size of the system, decrease the costs by reducing the number of parts, and simplify designing needs by having a consistent configuration and reducing the footprint of the system. A single module aftertreatment system may include a number of aspects, including an outer beaded body for mounting and joint interfaces.

II. Overview of Aftertreatment System

FIG. 1 depicts an aftertreatment system 100 having an example reductant delivery system 110 for an exhaust system 190. The aftertreatment system 100 includes a diesel particulate filter (DPF) 102, the reductant delivery system 110, a decomposition chamber or reactor 104, a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea, aqueous ammonia, or diesel exhaust fluid (DEF), into ammonia. The decomposition chamber 104 includes a reductant delivery system 110 having a dosing module 112 configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 to which the dosing module 112 is mounted. The dosing module 112 is fluidly coupled to one or more reductant sources 116. In some implementations, a pump 118 may be used to pressurize the reductant from the reductant source 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

The exhaust system 190 may further include a diesel oxidation catalyst (DOC) in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber or reactor pipe 104. For instance, the DPF 102 and the SCR catalyst 106 may be combined into a single unit, such as an SDPF. In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit, such as a sample pipe extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensor 150 may be utilized for detecting a condition of the exhaust gas, such as two, three, four, five, or size sensor 150 with each sensor 150 located at one of the foregoing positions of the exhaust system 190.

The aftertreatment system 100 may be formed into a single module aftertreatment system having one or more of the following features.

III. Example Outer Beaded Body for Mounting and Joint Interfaces

Pre-existing mounting areas and/or components for aftertreatment system may use an extra heat shield piece welded to an outer body through the use of plug welds. However, this design adds weld material over a mounting zone, which can result in added complexity associated with installation and assembly of components due to potential interference between components and multiple welds at the same location.

Referring to FIG. 2, a single module aftertreatment system 200 may provide one or more mounting zones 210 on an exterior surface 202 of the single module aftertreatment system 200 for mounting other components to the single module aftertreatment system 200. The one or more mounting zones 210 may be used for mounting components, such as mounting brackets for mounting the aftertreatment system to a support structure, such as a frame of a vehicle and/or a support structure for a power generator. Mounting brackets may be welded, clamped, and/or otherwise attached to the provided mounting zones 210 of the single module aftertreatment system 200. Such mounting zones 210 may need to be free of any welds such that force transfer from the clamped brackets is directly transferred to the exterior surface 202 of the single module aftertreatment system 200 to not provide any additional stress forces to weld joints between components of the single module aftertreatment system 200. In addition, providing mounting zones 210 clear of welds may permit welding of mounting brackets or other components without compromising the structural integrity of the mounting zone 210. Because of the reduced length and size of the single module aftertreatment system 200, there is a limited amount of space at the mounting zones 210.

As shown in FIG. 2, a mounting zone 210 is formed on a portion of a beaded outer body 204 to provide structural support where mounting brackets are to be attached to the single module aftertreatment system 200. An inner body 220 may contain one or more components 222 of the single module aftertreatment system 200. The one or more components 222 may include a catalyst, a particulate filter (e.g., a diesel particulate filter), etc. In some implementations, the inner body 220 containing the one or more components 222 may be separately manufactured, such as a canned catalyst or premade diesel particulate filter. An outer body 230 may be provided around a portion of the inner body 220 to provide air gap insulation 232 and mounting zones 210. In some implementations, the air gap may include insulation between the mounting zone 210 and the inner body 220. The outer body 230 may be a body to house multiple components within the single module aftertreatment system 200. The mounting zone 210 will transmit the clamping force to the inner body 220 and/or to a welded joint while reducing the likelihood and/or preventing buckling or flexing of the mounting zone 210. In particular, the outer body 230 of the single module aftertreatment system 200 includes an outer beaded portion 240, one or more inner diameter portions 250, 252 for coupling to the inner body 220, and a mounting zone 210.

In some implementations, the outer body 230 includes a first and second inner diameter portion 250, 252, with the second inner diameter portion 250 spaced downstream from the first inner diameter portion 252. In some implementations, the mounting zone 210 is positioned between the first and second inner diameter portions 250, 252. That is, the first inner diameter portion 252 may be positioned at a first end of the mounting zone 210 and the second inner diameter portion 250 may be positioned at a second end of the mounting zone 210. The inner body 220, the mounting zone 210, the first inner diameter portion 252, and the second inner diameter portion 250 may define a gap 232, such as an air gap or gap filled with insulation, between the outer body 230 and the inner body 220 that reduces heat transfer from the inner body 220 to the mounting zone 210. That is, the mounting zone 210 may be separated from the inner body 220 by the first inner diameter portion 252 and the second inner diameter portion 250 so as to form an air gap 232 between the mounting zone 210 of the outer body 230 and the inner body 220. The inner diameter portions 250, 252 can be welded to a portion of the inner body 220 to mechanically couple the outer body 230 to the inner body 220. The outer beaded portion 240 provides a physical barrier for aligning components attached to the mounting zone 210 and/or retaining attachment members, such as clamps, straps, etc., in the mounting zone 210.

The mounting zone 210 can transmit applied loads or forces directly through the bodies 230, 220 and/or flanges of the single module aftertreatment system 200 without any other component welded on top of it. In the implementation shown, when a mounting clamp or other mounting device is attached to the mounting zone 210 of the outer body 230, then force from the mounting clamp or other mounting device is transferred directly from the outer body 230 to the inner body 220 via the welded inner diameter portions 250 welded to the inner body 220. Thus, any force from the mounting clamp or other mounting device is directly transferred to the inner body 220 without affecting any surrounding components.

The design shown in FIG. 2 allows for an simplified manufacturing process by avoiding any interference issues to the inner body 220 when mounting components to the mounting zone 210 and providing a clear area for any welding done. This design also provides an air gap 232 between the inner body 220 and outer body 230 that creates an insulation mechanism to reduce and/or avoid conduction heat transfer at the mounting zone 210 between the inner body 220 and outer body 230. This design also allows for insulation to be added between the two bodies 220, 230 if needed.

To construct the outer beaded body 230, the outer beaded body 230 is formed in the desired diameter of the mounting zone 210 to provide the necessary structural support for attached components and/or mounting brackets. The outer beaded body 230 may be a one piece body made up of 439 stainless steel with 14 gauge thickness. The one piece body 230 is slid over the inner body 220 and is welded to the inner body 220 at the lowest inner diameter section(s) 250, 252. There are two transition zone sections before and after the mounting zone 210 ends that can be used to weld inlet heat shields, flanges, and/or a principal joint between the inner body 220 and outer body 230 to reduce the likelihood or avoid possible interference between components during assembly. The outer beaded body 230 can transmit the clamping force with minimum conductive heat transfer between the inner body 220 and outer body 230. Once the outer beaded body 230 is assembled with the inner body 220, a mounting member, such as clamps, straps, etc., can be positioned over the mounting zone 210 and attached to the mounting zone 210, such as via welding the mounting member to the mounting zone 210, tightening a portion of the mounting member to clamp the mounting member to the mounting zone 210, etc.

A single beaded outer body 230 thus can provide sufficient structural support to the mounting zone 210 to reduce the likelihood and/or avoid buckling due to excessive clamping force. Moreover, by being a single piece outer body 230 with minimal surface area contacting the inner body 220 and creating an air gap 232, heat transfer due to conduction is reduced. Furthermore, the geometry opposite to the beaded section 240 can reduce the likelihood and/or prevent interference between welds or components and provide a clear welding area for mounting brackets or other components.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

As utilized herein, the terms "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A single module aftertreatment system comprising:
   an inner body;
   a catalyst within the inner body; and
   an outer body attached to a portion of the inner body and comprising:
      a mounting portion having a flat upper surface, and
      a beaded portion adjacent to the mounting portion and configured to act as a physical barrier for aligning components mounted on the mounting portion,
      wherein (i) an inner surface of the mounting portion facing an outer surface of the inner body, and (ii) an inner surface of the beaded portion facing the outer surface of the inner body, are separated from the inner body so as to form an air gap, and
      wherein a maximum distance from the outer surface of the inner body to the inner surface of the beaded portion is greater than a maximum distance from the outer surface of the inner body to the inner surface of the mounting portion.

2. The single module aftertreatment system of claim 1, wherein the outer body includes a mounting bracket welded to the flat mounting portion.

3. The single module aftertreatment system of claim 1, wherein the air gap includes insulation between the mounting portion of the outer body and the inner body.

4. The single module aftertreatment system of claim 1, wherein the outer body includes an inner diameter portion, wherein the outer body is attached to a portion of the inner body by a weld joint between the inner diameter portion and the portion of the inner body.

5. The single module aftertreatment system of claim 4, wherein the inner diameter portion is a first inner diameter portion, wherein the outer body comprises a second inner diameter portion spaced downstream from the first inner diameter portion, the second inner diameter portion attached to the inner body by a weld joint.

6. The single module aftertreatment system of claim 5, wherein the mounting portion is positioned between the first inner diameter portion and the second inner diameter portion.

7. The single module aftertreatment system of claim 6, wherein the mounting portion is separated from the inner body by the first inner diameter portion and the second inner diameter portion so as to form an air gap between the flat mounting zone portion of the outer body and the inner body.

8. The single module aftertreatment system of claim 1, wherein the mounting portion transmits force directly to the inner body.

9. A method of manufacturing a single module aftertreatment system comprising:
   providing an inner body configured to contain a catalyst within the inner body;
   providing an outer body having an inner diameter portion, the outer body comprising:
      a mounting portion having a flat upper surface, and
      a beaded portion adjacent to the mounting portion and configured to act as a physical barrier for aligning components mounted on the mounting portion, the flat mounting portion being parallel to the inner body;
   sliding the outer body over the inner body; and
   welding the inner diameter portion of the outer body to a portion of the inner body;
   wherein (i) an inner surface of the mounting portion facing an outer surface of the inner body, and (ii) an inner surface of the beaded portion facing the outer surface of the inner body, are separated from the inner body so as to form an air gap, and
   wherein a maximum distance from the outer surface of the inner body to the inner surface of the beaded portion is greater than a maximum distance from the outer surface of the inner body to the inner surface of the mounting portion.

10. The method of claim 9, further comprising positioning a mounting member over the mounting portion.

11. The method of claim 10, further comprising welding the mounting member to the mounting portion.

12. The method of claim 10, further comprising tightening a portion of the mounting member to clamp the mounting member to the mounting portion.

13. The method of claim 9, wherein the air gap reduces heat transfer from the inner body to the mounting portion.

14. A single module aftertreatment system comprising:
   an inner body housing a catalyst; and
   an outer body comprising:
      a mounting portion having a flat upper surface, and
      a beaded portion adjacent to the mounting portion,
      a first inner diameter portion at a first end of the mounting portion, the first inner diameter portion attached to the inner body at a first location, and
      a second inner diameter portion at a second end of the mounting portion, the second inner diameter portion attached to the inner body at a second location,
      wherein (i) an inner surface of the mounting portion facing an outer surface of the inner body, and (ii) an inner surface of the beaded portion facing the outer surface of the inner body are separated from the inner body so as to form an air gap that reduces heat transfer from the inner body to the outer body, and wherein a maximum distance from the outer surface of the inner body to the inner surface of the beaded portion is greater than a maximum distance from the outer surface of the inner body to the inner surface of the mounting portion.

* * * * *